Figure 2:
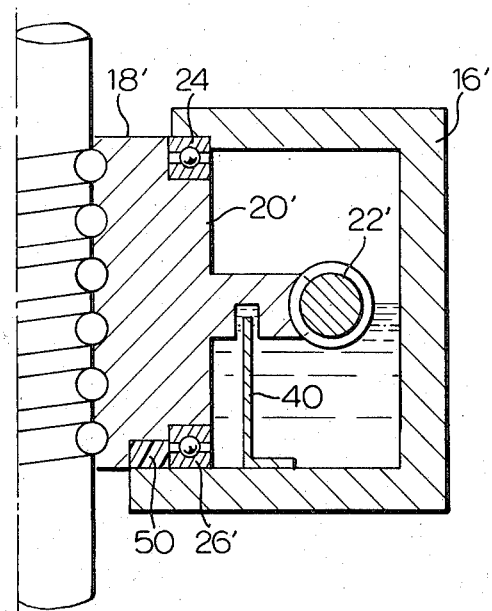

United States Patent [19]
Hunter

[11] 3,858,458
[45] Jan. 7, 1975

[54] OIL SEAL BARRIER FOR JACKS

[75] Inventor: Terry Albert Hunter, Peterborough, Ontario, Canada

[73] Assignee: Canadian General Electric Company Limited, Toronto, Ontario, Canada

[22] Filed: Sept. 24, 1973

[21] Appl. No.: 400,398

[52] U.S. Cl. .................. 74/606, 277/134, 308/36.1, 184/1 R
[51] Int. Cl. ............................................ F16h 57/02
[58] Field of Search ...... 277/134; 308/36.1; 74/425; 184/1 R

[56] References Cited
UNITED STATES PATENTS

| | | | |
|---|---|---|---|
| 1,522,596 | 1/1925 | Sharde | 277/134 |
| 1,553,767 | 9/1925 | Fulton | 277/134 |
| 2,657,591 | 11/1953 | Kaelin | 74/425 |
| 3,348,851 | 10/1967 | Symons et al | 277/134 |
| 3,523,599 | 8/1970 | Denkowski | 74/425 |

Primary Examiner—Wesley S. Ratliff, Jr.
Attorney, Agent, or Firm—R. A. Eckersley

[57] ABSTRACT

A worm driven recirculating ball actuator for axially displacing a very long actuator rod is provided with a worm in meshing relation with a worm wheel through the centre of which extends the threaded long actuator rod. An oil dam isolates the rod aperture from the worm mechanism and extends well above the level where the worm and worm wheel mesh, so as to permit full immersion of the gear portion of the transmission with effectively total sealing of the oil bath. The improved reliability is of considerable importance in actuators used in a nuclear reactor environment.

5 Claims, 2 Drawing Figures

Patented Jan. 7, 1975 3,858,458

OIL SEAL BARRIER FOR JACKS

This invention is directed to an improved linear actuator suitable for use in a nuclear environment, and in particular to a worm driven actuator driving a generally vertically extending threaded rod.

In the operation of nuclear reactors utilizing long stroke actuators for repeatedly repositioning refuelling apparatus by vertical displacement of a supporting table, it is of utmost importance that the system components shall have maximum reliability.

In the case of actuators of the type presently considered, wherein a long threaded shaft having a length in the order of 30 feet extends vertically through the centre of the device, any malfunction of oil seals of the prior type actuator used required the removal of the actuator from the nuclear environment and the withdrawal of the shaft from the body of the actuator before the malfunction could be rectified.

Such prior art actuators relied upon a wiper type seal as the main seal, with a low level barrier to retain a minimal quantity of lubricating oil in the housing in case of failure of the main seal.

The present invention provides a long stroke actuator wherein an oil dam component serving as an oil seal is provided to isolate the actuator shaft from the oil bath within the actuator housing, in which bath the worm and its associated gear are effectively immersed, and wherein rubbing contact in the seal is avoided.

One advantage provided by the construction according to the present invention is the avoidance of mechanical contact between moving component parts of the actuator, other than the actual transmission members. This serves both to avoid wear on the oil seal and to reduce drag on the actuator.

Further, the present invention makes possible the maintenance of a greater depth of oil bath in relation to the more heavily loaded transmission components of the actuator, without increasing the likelihood of oil leakage from the actuator.

While the present disclosure is directed to a vertically oriented actuator, it will be understood that the benefits of the present invention apply almost equally to an actuator inclined sufficiently to still retain the effectiveness of the subject novel oil seal arrangement.

The present invention thus provides in a rotary actuator having a casing, a rotary input means mounted therein, a driven gear in driven connection with the input means mounted in the casing for rotation about an inclined axis, having an elongated output shaft extending therethrough connected in driven relation with the driven gear, the improvement comprising oil seal means within said casing surrounding a portion of the length of the shaft in radially spaced relation therefrom, the seal being connected in sealing relation with the casing to provide a sealed entry aperture for the shaft through a lower wall portion of the actuator casing, the seal having a barrel portion extending upwardly therefrom to a predetermined level to lubricate the input means, for retaining lubricant at a predetermined level in relation thereto, while isolating the lubricant from contacting relation with the output shaft, to preclude loss of lubricant therepast.

Figure 1:
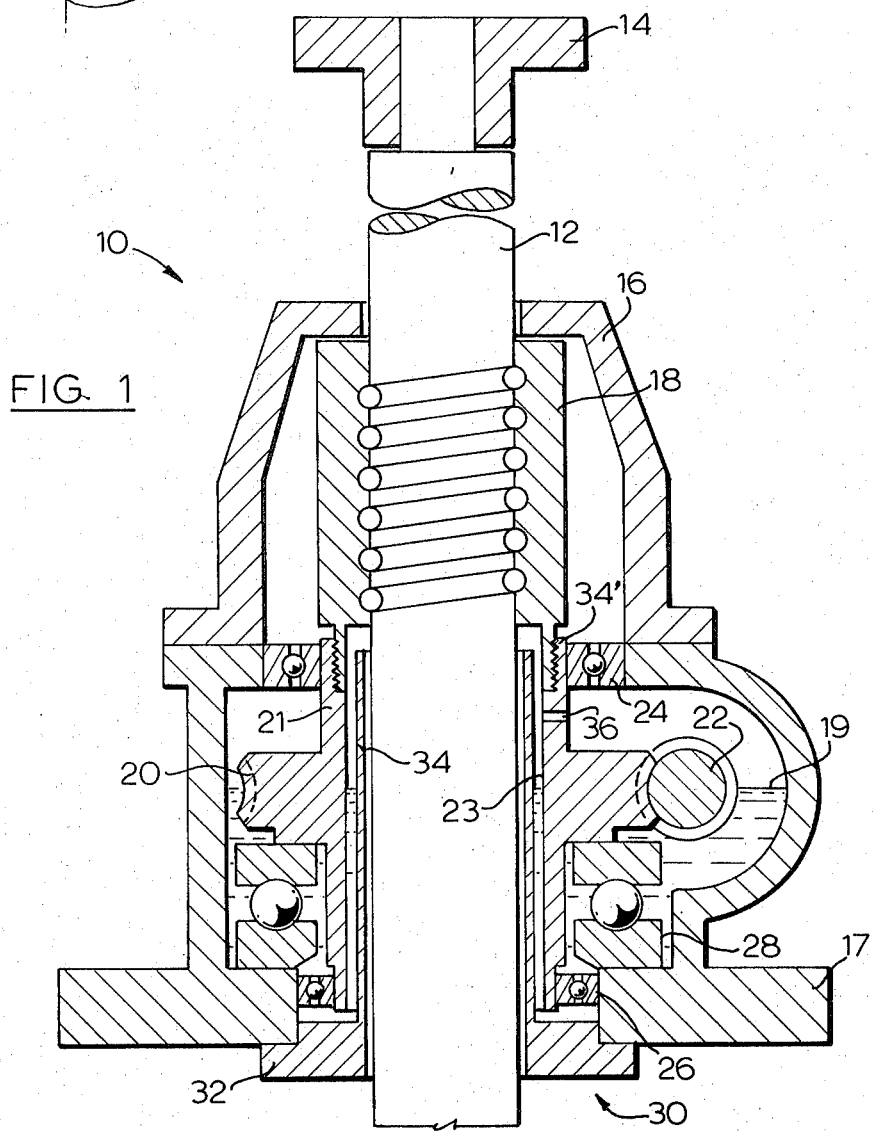

Certain embodiments of the present invention are described, reference being made to the accompanying drawings, wherein;

FIG. 1 is a diametrical sectional elevation of an actuator according to the present invention; and FIG. 2 is a partial view, similar to FIG. 1, showing an arrangement according to the prior art.

FIGS. 1 and 2 illustrate section and part section views respectively of long stroke actuators having a worm input drive operating through a worm gear and recirculating nut to provide axial displacement of the actuator output rod. In the case of the FIG. 2 prior art, the actuator has a threaded output shaft extending through a casing 16'. A input member comprising a worm 22' is rotatably driven by external means such as an electric motor (not shown). The worm 22', being in meshing relation with the gear wheel 20', rotates the wheel 20' about the central vertical axis of the machine, whereby producing rotation of the ball nut portion 18' which constitutes a recirculating ball nut by which the output rod or shaft is engaged.

The gear wheel 20' is mounted for rotation in bearings 24, 26', being generally immersed to the centre line of the worm.

The worm 22' is thus partially immersed in an oil bath, the surface of which is indicated, being retained by a seal 50 which is in rubbing contact with the gear wheel lower surface, having an internal annular barrier or dam 40 which extends within an annular recess of the wheel 20' to serve as a back-up seal to retain a minimal quantity of oil in case of failure of the seal 50.

Thus in the event that the seal 50 should fail, the oil is maintained at a lower level by the barrier 40, such oil level being sufficient to permit operation of the actuator for a short period of time after the seal 50 fails.

In the event of damage to the seal 50, which readily occurs due to the wear factor, it will be appreciated just how difficult a problem it is to withdraw the threaded output shaft and replace the seal 50.

Owing to the limit placed on the height of the internal oil retaining barrier 40, the effectiveness of lubrication, and/or cooling of the mating portions of the worm 22 and the gear wheel 20' is severely limited by the limited depth of the oil bath within the casing 16'. Owing to this depth limitation, operation of the device after the seal fails is limited, and orientation of the device in other than a vertical attitude imposes even greater limitations on the actuator, after seal failure.

It will be understood that the rate of wear of the seal 50 is adversely affected by wear in the bearings, particularly the bearing 26'. Accordingly, the satisfactory service life of the prior art actuator may be severely limited, which is cause for concern when use in a nuclear reactor is proposed.

Referring to FIG. 1, the actuator 10 according to the present invention has an output rod or shaft 12 having a threaded outer surface thereon. The actuator housing 16 includes a base flange portion 17 for mounting purposes. The shaft 12 is engaged by a ball nut 18 having an extension portion 21, to which the nut 18 is threadedly attached at 34'.

A worm 22 rotatably mounted in the housing 16, and driven by a motor (not shown) engages the gear wheel 20 in meshing relation therewith.

The wheel 20 is supported by an upper bearing 24, a lower bearing 26 and a thrust bearing 28.

An oil seal 30, having an annular flange portion 32 attached in sealing relation to a corresponding aperture in the casing flange 17 is provided with an annular boss portion 34 extending upwardly from the flange 32 towards the nut 18, to provide a dam surrounding the shaft 12 and spaced radially therefrom, to contain the oil bath, shown as having a level 19, clear of the shaft 18.

The inner diameter of the gearwheel 20 is spaced radially outwardly from the boss 34, so that there is no mechanical contact of the boss 34 with any rotary part of the device.

An oil bleed hole 36 extends through the extension portion 21 of the gearwheel 20, to divert any leakage oil that may migrate under centrifugal force up the bore surface 23, back to the oil bath.

It will be evident that, in addition to a low cost sealing arrangement, the present invention provides an effective, non-rubbing seal suitable for permitting effective levels of lubrication in the subject arrangement and much more suited than the illustrated prior art arrangement for operating at attitudes inclined somewhat from the vertical.

Since the seal does not rub and is of a somewhat robust nature there is no forseeable way in which it can fail. This eliminates the problem of seal replacement as well as the undesirable consequences of seal failure

What I claim as new and desire to secure by Letters Patent of the United States is:

1. In a rotary actuator having a casing, a rotary input shaft mounted therein, a gear wheel in driven connection with said input shaft mounted for rotation about an inclined axis, having an elongated output shaft extending therethrough connected in driven relation with the driven gear, the improvement comprising oil dam seal bushing means surrounding said output shaft, in radially spaced relation therefrom, said bushing means being connected in sealing relation with said casing and having an axially extending dam portion extending upwardly above the level of an oil bath in which said input shaft rotates, to effectively isolate said output shaft from the oil of the bath.

2. The actuator as claimed in claim 1 wherein said input shaft has a worm secured thereto engaged in meshing relation with said driven gear.

3. The actuator as claimed in claim 2 wherien said bushing means includes an end flange portion sealingly attached to said casing, the bushing having a barrel portion extending upwardly therefrom in radially interposed non-contacting relation between said shaft and a radially inner surface of said gear.

4. The actuator as claimed in claim 1 including oil recirculation path means extending through said gear wheel to transfer oil mounting above the level of said bath along said dam seal bushing back to said bath.

5. The actuator as claimed in claim 2, said driven gear having a ball nut secured thereto located above said oil dam, to provide a driving connection from said driven gear to said output shaft at a position located above said oil bath.

* * * * *